(12) United States Patent
Schlosser et al.

(10) Patent No.: US 6,255,371 B1
(45) Date of Patent: Jul. 3, 2001

(54) FLAME-RETARDANT COMBINATION

(75) Inventors: Elke Schlosser; Bernd Nass, both of Augsburg; Wolfgang Wanzke, Meitingen, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/617,473

(22) Filed: Jul. 17, 2000

(30) Foreign Application Priority Data

Jul. 22, 1999 (DE) .............................................. 199 33 901

(51) Int. Cl.⁷ ....................................................... C08K 5/34
(52) U.S. Cl. .......................... 524/100; 524/126; 524/133; 524/135; 252/609
(58) Field of Search ............................. 252/609; 524/100, 524/126, 133, 135

(56) References Cited

U.S. PATENT DOCUMENTS

| | | |
|---|---|---|
| 3,900,444 | 8/1975 | Racky et al. . |
| 4,010,137 | 3/1977 | Brady . |
| 4,036,811 | 7/1977 | Noetzel et al. . |
| 4,080,501 * | 3/1978 | Leman et al. ...................... 544/195 |
| 5,326,805 | 7/1994 | Sicken et al. . |
| 5,344,931 * | 9/1994 | Cipolli et al. ...................... 544/195 |
| 6,031,032 * | 2/2000 | Horacek et al. ...................... 524/100 |

FOREIGN PATENT DOCUMENTS

| | | |
|---|---|---|
| 2246124 | 2/1999 | (CA) . |
| 78871/98 | 2/1999 | (AU) . |
| 44 36 281 | 4/1996 | (DE) . |
| WO 97/39053 | 10/1997 | (WO) . |
| WO 98/08898 | 3/1998 | (WO) . |

* cited by examiner

Primary Examiner—Kriellion Sanders
(74) Attorney, Agent, or Firm—Andrew Pang; Scott E. Hanf

(57) ABSTRACT

The invention relates to a novel flame retardant combination comprising, as component A, a phosphinate of the formula (I) and/or a diphosphinate of the formula (II) and/or polymers of these

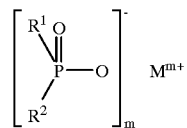
(I)

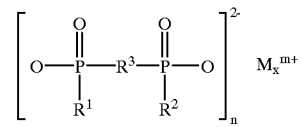

(II)

where $R^1$ and $R^2$ are identical or different and are $C_1$–$C_6$-alkyl, linear or branched, and/or aryl; $R^3$ is $C_1$–$C_{10}$-alkylene, linear or branched, $C_6$–$C_{10}$-arylene, -alkylarylene or -arylalkylene; M is calcium ions, magnesium ions, aluminium ions and/or zinc ions, preferably aluminium or zinc; m is 2 or 3; n is 1 or 3; x is 1 or 2; and comprising, as component B, condensation products of melamine and/or reaction products of melamine with phosphoric acid and/or reaction products of condensation products of melamine with phosphoric acid and/or comprising a mixture of these. The invention also relates to the use of the abovementioned flame retardant combination, especially in thermoplastic polymers.

22 Claims, No Drawings

FLAME-RETARDANT COMBINATION

BACKGROUND OF THE INVENTION

The invention relates to a novel flame retardant combination and to its use, in particular in thermoplastic polymers.

The salts of phosphinic acids (phosphinates) have proven to be effective flame-retardant additives, in particular for thermoplastic polymers (DE-A-2 252 258 and DE-A-2 447 727). Calcium phosphinates and aluminum phosphinates have been described as particularly effective in polyesters, and impair the material properties of the polymer molding compositions less than when the alkali metal salts, for example, are used (EP-A-0 699 708).

SUMMARY OF THE INVENTION

Synergistic combinations of phosphinates with certain nitrogen-containing compounds have also been found and in very many polymers act as more effective flame retardants than the phosphinates alone (PCT/EP97/01664 and also DE-A-197 34 437 and DE-A-197 37 727).

DESCRIPTION OF THE PREFERRED EMBODIMENTS

Effective synergists described include melamine and melamine compounds, such as melamine cyanurate and melamine phosphate, which themselves also have a certain flame-retardant action in certain thermoplastics but are markedly more effective in combination with phosphinates.

However, the effectiveness of the combinations in specific thermoplastics is still unsatisfactory since, for example, the specification V-0 under the frequently international standard UL 94 is not achieved or is achieved only when relatively high amounts are added.

Higher-molecular-weight derivatives of melamine have also been described as flame retardants, for example the condensation products melam, melem and melon, and also corresponding reaction products of these compounds with phosphoric acid, such as dimelamine pyrophosphate and melamine polyphosphates. However, the amounts which have to be added in thermoplastics are relatively high, in particular in the case of glass-fiber-reinforced materials.

The object of the present invention is therefore to provide flame retardant combinations which, even when used in small amounts, have excellent effectiveness as flame retardants in the appropriate plastics, in particular in thermoplastic polymers.

This object is achieved by a flame retardant combination comprising, as component A, a phosphinate of the formula (I) and/or a diphosphinate of the formula (II) and/or polymers of these

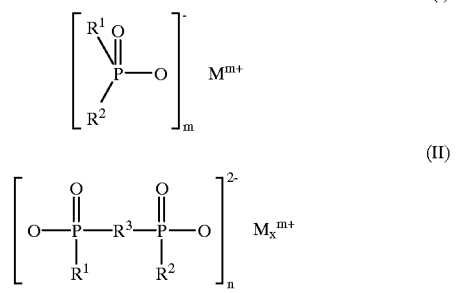

where
R$^1$ and R$^2$ are identical or different and are C$_1$–C$_6$-alkyl, linear or branched, and/or aryl;

R$^3$ is C$_1$–C$_{10}$-alkylene, linear or branched, C$_6$–C$_{10}$-arylene, -alkylarylene or -arylalkylene;

M is magnesium, calcium, aluminum or zinc, m is 2 or 3;

n is 1 or 3;

x is 1 or 2 and comprising, as component B, condensation products of melamine and/or reaction products of melamine with phosphoric acid and/or reaction products of condensation products of melamine with phosphoric acid and/or comprising a mixture of these.

Surprising, it has now been found that the abovementioned higher-molecular-weight melamine derivatives and, respectively, the phosphoric-acid reaction products of these, in combination with phosphinates, have markedly more effective flame retardancy than the known combinations with the low-molecular-weight melamine derivatives, such as melamine cyanurate or melamine phosphate.

Mixtures of condensation products of melamine and, respectively, of melamine-phosphoric-acid reaction products with phosphinates have stronger synergetic effect and therefore provide more effective flame retardancy for thermoplastic polymers, in particular polyamides, polyesters and blends of PPE/HIPS than do the phosphinates alone or the mixtures previously described in PCT/EP97/01664, and also DE-A-197 34 437 and DE-A-197 37 727.

It has also been found that the novel combinations have better processing properties in polyesters, since they degrade the polyester to a markedly smaller extent during incorporation of the flame retardant than do the known combinations of phosphinates with melamine derivatives in the prior art.

R$^1$ and R$^2$ are preferably identical or different and are C$_1$–C$_6$-alkyl, linear or branched, and/or aryl.

R$^1$ and R$^2$ are particularly preferably identical or different and are methyl, ethyl, n-propyl, isopropyl, n-butyl, tert-butyl, n-pentyl and/or phenyl.

R$^3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene.

M is preferably aluminum ions or zinc ions.

Component B is preferably condensation products of melamine, where the condensation products of melamine are preferably melem, melam, melon and/or more highly condensed compounds thereof, or omponent B is preferably reaction products of melamine with phosphoric acid and/or reaction products of condensation products of melamine with phosphoric acid or a mixture of these, where the reaction products are preferably dimelamine pyrophosphate, melamine polyphosphate, melem polyphosphate, melam polyphosphate and/or mixed poly-salts of this type.

Component B is particularly preferably melamine polyphosphates having chain lengths >2, in particular >10.

The invention also relates to the use of the novel flame retardant combination for rendering thermoplastic polymers flame-retardant.

For the purposes of the present invention, thermoplastic polymers are, as stated by Hans Dominighaus in "Die Kunststoffe und ihre Eigenschaften", 5$^{th}$ Edition (1998), p. 14, polymers having molecular chains with no side branches or with side branches varying in their length and number, and which soften when heated and can be shaped in almost any desired way.

The thermoplastic polymers are preferably HIPS (high-impact polystyrene), polyphenylene ethers, polyamides, polyesters, polycarbonates and blends or polymer blends of the type ABS (acrylonitrile-butadiene-styrene) or PC/ABS (polycarbonate/acrylonitrile-butadiene-styrene) or PPE/HIPS (polyphenylene ether/high-impact polystyrene). High-impact polystyrene is a polystyrene with increased impact strength.

Particularly preferred thermoplastic polymers are polyamides, polyesters and blends of PPE/HIPS.

Thermoplastic polymers which comprise the novel flame retardant combinations and, if desired, fillers and reinforcing materials and/or other additives, as defined below, are hereinafter termed plastic molding compositions.

For the abovementioned use it is preferable for each of the components A and B, independently of one another, to be used at a concentration of from 1 to 30% by weight, based on the plastic molding composition.

For the abovementioned use it is preferable for each of the components A and B, independently of one another, to be used at a concentration of from 3 to 20% by weight, based on the plastic molding composition.

For the abovementioned use it is preferable for each of the components A and B, independently of one another, to be used at a concentration of from 3 to 15% by weight, based on the plastic molding composition.

Finally, the invention also provides a flame-retardant plastic molding composition comprising the novel flame retardant combination.

The plastic is preferably thermoplastic polymers of the type HIPS (high-impact polystyrene), polyphenylene ethers, polyamides, polyesters, polycarbonates and blends or polymer blends of the type ABS (acrylonitrile-butadiene-styrene) or PC/ABS (polycarbonate/acrylonitrile-butadiene-styrene) or PPE/HIPS (polyphenylene ether/high-impact polystyrene).

The polymers of the flame-retardant plastic molding composition are particularly preferably polyamide or polyester or blends of PPE/HIPS.

Component B is condensation products of melamine or reaction products of melamine with phosphoric acid, or reaction products of condensation products of melamine with phosphoric acid, or else a mixture of the abovementioned products.

Examples of condensation products of melamine are melem, melam and melon, and also the more highly condensed compounds of this type and mixtures of the same. An example of a preparation method for these is that described in PCT/WO 96/16948.

For the purposes of the present invention, the reaction products with phosphoric acid are compounds produced by reacting melamine or the condensed melamine compounds, such as melam, melem or melon, etc., with phosphoric acid. Examples of these are melamine polyphosphate, melam polyphosphate and melem polyphosphate and the mixed polysalts, for example as described in WO 98/39306.

The abovementioned compounds are known from the literature and may also be prepared by processes other than the direct reaction with phosphoric acid. For example, melamine polyphosphate may be prepared as in PCT/WO 98/45364 by reacting polyphosphoric acid and melamine, or else as in PCT/WO 98/08898 by condensing melamine phosphate and, respectively, melamine pyrophosphate.

The thermoplastic polymers in which the novel flame retardant combinations can be used effectively are described in the international patent application PCT/WO 97/01664.

These include:
1. Polymers of mono- or diolefins, for example polypropylene, polyisobutylene, polybutylene, poly-1-butene, polyisoprene and polybutadiene, and also polymers of cycloolefins, for example of cyclopentene or of norbornene; also polyethylene, which may have crosslinking if desired; e.g. high-density polyethylene (HDPE), high-density high-molecular-weight polyethylene (HDPE-HMW), high-density ultrahigh-molecular-weight polyethylene (HDPE-UHMW), medium-density polyethylene (MDPE), low-density polyethylene (LDPE), linear low-density polyethylene (LLDPE), or low-density branched polyethylene (VLDPE).
2. Mixtures of the abovementioned polymers, for example mixtures of polypropylene with polyisobutylene, polypropylene with polyethylene (e.g.: PP/HDPE, PP/LDPE) and mixtures of various polyethylene grades, for example LDPE/HDPE.
3. Copolymers of mono- or of diolefins with one another or with other vinyl monomers, e.g. ethylene-propylene copolymers, linear low-density polyethylene (LLDPE) and mixtures of the same with low-density polyethylene (LDPE), propylene-1-butene copolymers, propylene-isobutylene copolymers, ethylene-1-butene copolymers, etc.; and also ethylene-alkyl acrylate copolymers, ethylene-vinyl acetate copolymers and copolymers of these with carbon monoxide, and ethylene-acrylic acid copolymers and salts of these (ionomers), and also terpolymers of ethylene with propylene and with a diene, such as hexadiene, dicyclopentadiene or ethylidenenorbornene; and also mixtures of copolymers of this type with one another or with the polymers mentioned under 1., e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers, and polyalkylene-carbon monoxide copolymers of alternating or random structure and mixtures of these with other polymers, e.g. with polyamides.
4. Polystyrene, poly(p-methylstyrene), poly(α-methylstyrene).
5. Copolymers of styrene or α-methylstyrene with dienes or with acrylics, e.g. styrene-butadiene, styrene-acrylonitrile, styrene-alkyl methacrylate, styrene-butadiene-alkyl acrylate, styrene-butadiene-alkyl methacrylate, styrene-maleic anhydride, styrene-acrylonitrile-methacrylate; high-impact-strength mixtures made from styrene copolymers with another polymer, e.g. with a polyacrylate, with a diene polymer or with an ethylene-propylene-diene terpolymer; and also block copolymers of styrene, e.g. styrene-butadiene-styrene, styrene-isoprene-styrene, styrene-ethylene/butylene-styrene or styrene-ethylene/propylene-styrene.
6. Graft copolymers of styrene or α-methylstyrene, e.g. styrene on polybutadiene, styrene on polybutadiene-styrene copolymers or on polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic imide on polybutadiene, styrene and maleimide on polybutadiene; styrene and alkyl acrylates and, respectively, alkyl methacrylates on polybutadiene; styrene and acrylonitrile on ethylene-propylene-diene terpolymers; styrene and acrylonitrile on polyalkyl acrylates or on polyalkyl methacrylates; styrene and acrylonitrile on acrylate-butadiene copolymers, and also mixtures of these with the polymers mentioned under 5., known as ABS polymers, MBS polymers, ASA polymers or AES polymers, for example.

7. Halogen-containing polymers, e.g. polychloroprene, chlorinated rubber, chlorinated or brominated copolymer made from isobutylene-isoprene (halogenated butyl rubber), chlorinated or chlorosulfonated polyethylene, copolymers of ethylene with chlorinated ethylene, epichlorohydrin homo- and copolymers, in particular polymers made from halogen-containing vinyl compounds, e.g. polyvinyl chloride, polyvinylidene chloride, polyvinyl fluoride, polyvinylidene fluoride; and also copolymers of these, for example vinyl chloride-vinylidene chloride, vinyl chloride-vinyl acetate and vinylidene chloride-vinyl acetate.

8. Polymers derived from α,β-unsaturated acids or from derivatives of these, for example polyacrylates and polymethacrylates, butyl-acrylate-impact-modified polymethyl methacrylates, polyacrylamides and polyacrylonitriles.

9. Copolymers of the monomers mentioned under 8. with one another or with other unsaturated monomers, e.g. acrylonitrile-butadiene copolymers, acrylonitrile-alkyl acrylate copolymers, acrylonitrile-alkoxyalkyl acrylate copolymers, acrylonitrile-vinyl halide copolymers and acrylonitrile-alkyl methacrylate-butadiene terpolymers.

10. Polymers derived from unsaturated alcohols and amines and respectively, from their acetyl derivatives or acetals, for example polyvinyl alcohol, polyvinyl acetate, polyvinyl stearate, polyvinyl benzoate, polyvinyl maleate, polyvinyl butyral, polyallylphthalate, polyallylmelamine; and also copolymers of these with the olefins mentioned under 1.

11. Polyacetals, such as polyoxymethylene, and also those polyoxymethylenes which contain comonomers, e.g. ethylene oxide; polyacetals modified with thermoplastic polyurethanes, with acrylates or with MBS.

12. Polyphenylene oxides, polyphenylene sulfides and mixtures of these oxides or sulfides with styrene polymers or with polyamides.

13. Polyamides and copolyamides derived from diamines and from dicarboxylic acids and/or from aminocarboxylic acids or from the corresponding lactams, for example nylon-4, nylon-6, nylon-6,6, 6,10, 6,9, 6,12, 4,6, 12,12, nylon-11, nylon-12, aromatic polyamides based on m-xylene, diamine and adipic acid; polyamides prepared from hexamethylenediamine and iso- and/or terephthalic acid and, if desired, from an elastomer as modifier, e.g. poly-2,4,4-trimethylhexamethylene-terephthalamide or poly-m-phenyleneisophthalamide. Block copolymers of the abovementioned polyamides with polyolefins, with olefin copolymers, with ionomers or with chemically bonded or grafted elastomers; or with polyethers, e.g. with polyethylene glycol, polypropylene glycol or polytetramethylene glycol. EPDM- or ABS-modified polyamides or copolyamides; and also polyamides condensed during processing ("IM polyamide systems").

14. Polyureas, polyimides, polyamideimides, polyetherimides, polyesterimides, polyhydantoins and polybenzimidazoles.

15. Polyesters derived from dicarboxylic acids and from dialcohols and/or from hydroxycarboxylic acids or from the corresponding lactones, for example polyethylene terephthalate, polybutylene terephthalate, poly-1,4-dimethylolcyclohexane terephthalate, polyhydroxybenzoates, and also block polyetheresters derived from polyethers having hydroxyl end groups; polyesters modified with polycarbonates or with MBS.

16. Polycarbonates and polyester carbonates.

17. Polysulfones, polyether sulfones and polyether ketones.

18. Mixtures (polyblends) of the abovementioned polymers, e.g. PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PU, PC/thermoplastic PU, POM/acrylate, POM/MBS, PPO/HIPS, PPO/nylon-6,6 and copolymers.

The term "phosphinate" used below covers salts of phosphinic and of diphosphinic acid and polymers of these.

The phosphinates, which are prepared in an aqueous medium, are essentially monomeric compounds. Depending on the reaction conditions, polymeric phosphinates can be produced under some circumstances.

Examples of phosphinic acids suitable as a constituent of the phosphinates are:

Dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid.

The phosphinates according to the invention may be prepared by known methods, for example as described in some detail in EP-A-0 699 708. The phosphinic acids here are prepared, for example, in aqueous solution with metal carbonates, with metal hydroxides or with metal oxides.

The amount of the phosphinate to be added to the polymers may vary within wide limits. Use is generally made of from 1 to 30% by weight, based on the plastic molding composition. The ideal amount depends on the nature of the polymer and on the type of component B, and on the type of phosphinate itself used. Preference is given to from 3 to 20% by weight, in particular from 3 to 15% by weight, based on the plastic molding composition.

The abovementioned phosphinates may be used in various physical forms for the novel flame retardant combination, depending on the nature of the polymer used and on the properties desired. For example, to achieve better dispersion in the polymer the phosphinate may be ground to a fine-particle form. Mixtures of different phosphinates may also be used, if desired.

The phosphinates as used according to the invention in the flame retardant combination are thermally stable, and neither decompose the polymers during processing nor affect the process of preparing the plastic molding composition. The phosphinates are not volatile under the customary conditions of preparation and processing of thermoplastic polymers.

The amount of the melamine condensation products according to the invention or of the melamine-phosphoric-acid reaction products according to the invention (component B) to be added to the polymers may likewise vary within wide limits. Use is generally made of from 1 to 30% by weight, based on the plastic molding composition. The ideal amount depends on the nature of the polymer, on the nature of the phosphinate used (component A) and on the nature of the melamine condensation product used, on the nature of the melamine-phosphoric acid reaction products used and, respectively, on the nature of the products used and derived by reacting condensation products of melamine with phosphoric acid (component B). Preferred amounts are from 3 to 20% by weight, in particular from 3 to 15% by weight.

The flame-retardant components A and B may be incorporated into thermoplastic polymers by, for example, premixing all of the constituents in powder and/or pellet form in a mixer and then homogenizing these in a polymer melt in a compounding assembly (e.g. a twin-screw extruder). The melt is usually drawn off as an extrudate, cooled and pelletized. Components A and B may also be introduced separately by way of a metering system directly into the compounding assembly.

It is also possible to admix the flame-retardant components A and B with finished polymer pellets or powder, and to process the mixture directly on an injection molding machine to give moldings. In the case of polyesters, for example, the flame-retardant additives A and B may also be added into the polyester composition as early as during the polycondensation.

Besides the novel flame retardant combination made from A and B, fillers and reinforcing material, for example glass fibers, glass beads or minerals, such as chalk, may be added to the molding compositions. The molding compositions may also comprise other additives, such as antioxidants, light stabilizers, lubricants, colorants, nucleating agents or antistats. Examples of additives which may be used are given in EP-A-584 567.

The flame-retardant plastic molding compositions are suitable for producing moldings, films, filaments or fibers, for example by injection molding, extrusion or pressing.

EXAMPLES

1. Components Used
Commercially Available Polymers (Pellets)
Nylon-6 (Nylon-6 GR): ®Durethan BKV 30 (Bayer AG, D) comprises 30% of glass fibers
Nylon-6,6 (Nylon-6,6 GR): ®Durethan AKV 30 (Bayer AG, D) comprises 30% of glass fibers
Polybutylene terephthalate ®Celanex 2300 GV1/ 30 (PBT GR): (Ticona, D) comprises 30% glass fibers
PPE/HIPS blend: ®Noryl N110 (GE Plastics, NL)
Flame Retardant Components (Pulverulent)
Component A
Aluminum diethylphosphinate, hereinafter termed DEPAL. Zinc diethylphosphinate, hereinafter termed DEPZN.
Component B
Melapur® MC (melamine cyanurate), DSM Melapur, NL
Melapur® MP (melamine phosphate), DSM Melapur, NL
Melapur 200 (melamine polyphosphate), DSM Melapur, NL 2. Preparation, Processing and Testing of Flame-retardant Plastic Molding Compositions The flame retardant components were mixed in the ratio given in the tables with the polymer pellets and any additives used, and incorporated in a twin-screw extruder (Leistritz LSM 30/34 type) at temperatures of from 240 to 280° C. (nylon-6 GR and PBT/GR) or from 260 to 300° C. (nylon-6,6 GR and PPE/HIPS). The homogenized polymer extrudate was drawn off, cooled in a water bath and then pelletized.

After adequate drying, the molding compositions were processed on an injection molding machine (model Toshiba IS 100 EN) at melt temperatures of from 260 to 280° C. (nylon-6 GR and PBT/GR) or from 270 to 300° C. (nylon-6,6 GR and PPE/HIPS) to give test specimens, and tested and classified for flame retardancy using the UL 94 (Underwriters Laboratories) test.

The processing properties of the novel combinations in polyester were assessed via their specific viscosity (SV). After adequate drying the pellets of the plastic molding composition were used to prepare a 1.0% strength solution in dichloroacetic acid and the SV determined. The higher the SV, the smaller the extent of degradation of the polymer during incorporation of the flame retardant.

Table 1 shows comparative examples in which aluminum diethylphosphinate (DEPAL) and, respectively, zinc diethylphosphinate and, respectively, melamine polyphosphate were tested as sole flame retardant components in glass-fiber-reinforced nylon-6, nylon-6,6, PBT and, respectively, PPE/HIPS.

Table 2 shows comparative examples in which aluminum diethylphosphinate was tested in combination with nitrogen-containing synergists, as described in PCT/WO 97/01664, in glass-fiber-reinforced nylon-6, nylon-6,6, PBT and, respectively, PPE/HIPS.

The results from the examples in which the novel flame retardant combination was used are listed in Table 3. All of the amounts are given in % by weight and are based on the plastic molding composition including the flame retardant combination.

It can be seen from the examples that the additives according to the invention (component B) in the combination with metal phosphinates brings about a marked rise in flame retardancy when admixed in appropriate amounts. When compared with each of A and B on its own, or with the combination of A with nitrogen-containing synergists, as described in PCT/WO 97/01664, the combination A+B gives a marked reduction in the amount of flame retardant needed, based on the plastic molding composition, to achieve the classification V-0, V-1 and, respectively, V-2.

The amount of flame retardant used to achieve a certain flammability classification can therefore be considerably reduced. This has an advantageous effect on the mechanical characteristics of the plastic molding composition and is also advantageous for ecological and economic reasons.

The compatibility of the novel combination during its incorporation into polyester is moreover better than that of the combination of A with nitrogen-containing synergists, as described in PCT/WO 97/01664.

TABLE 1

Comparative examples
Phosphinates (component A) and melamine polyphosphate (component B), each used on their own in glass-fiber-reinforced PBT, nylon-6, nylon-6,6, and, respectively, PPE/HIPS

| Polymer | DEPAL [%] | DEPZN [%] | Melamine polyphosphate [%] | UL 94 classification (1.6 mm) |
|---|---|---|---|---|
| PBT GR | 20 | | | V-1 |
| PBT GR | | | 20 | V-2 |
| Nylon-6 GR | 20 | | | V-2 |
| Nylon-6 GR | | | 20 | n.c.*) |
| Nylon-6,6 GR | 20 | | | n.c.*) |
| Nylon-6,6 GR | 25 | n.c.*) | | |
| Nylon-6,6 GR | | 20 | | V-2 |
| Nylon-6,6 GR | | | 20 | V-2 |
| PPE/HIPS | 20 | | | V-1 |
| PPE/HI PS | | | 20 | V-2 |

*)n.c. = not classifiable

TABLE 2

Comparative examples
Phosphinates (component A) in combination with
nitrogen-containing synergists in glass-fiber-
reinforced PB, nylon-6, nylon-6,6 and, respectively,
PPE/HIPS

| Polymer | DEPAL [%] | Melamine cyanurate [%] | Melamine phosphate [%] | UL 94 classification (1.6 mm) | SV |
|---|---|---|---|---|---|
| PBT GR | 10 | | 10 | V-2 | 323 |
| Nylon-6 GR | 10 | | 10 | V-1 | |
| Nylon-6,6 GR | 20 | 10 | | n.c.*) | |
| PPE/HIPS | 10 | 10 | | V-1 | |

*)n.c. = not classifiable

TABLE 3

Invention
Phosphinates (component A) in combination with melamine
polyphosphate (component B) in glass-fiber-reinforced
PBT, nylon-6, nylon-6,6 and, respectively, in PPE/HIPS

| Polymer | DEPAL [%] | DEPZN [%] | Melamine polyphosphate [%] | UL94 classification (1.6 mm) | SV |
|---|---|---|---|---|---|
| PBT GR | 10 | | 10 | V-0 | 488 |
| Nylon-6 GR | | 10 | 10 | V-0 | |
| Nylon-6 GR | 10 | | 5 | V-0 | |
| Nylon-6,6 GR | | 7.5 | 7.5 | V-0 | |
| Nylon-6,6 GR | | 10 | 10 | V-0 | |
| Nylon-6,6 GR | 8 | | 4 | V-0 | |
| Nylon-6,6 GR | 10 | | 5 | V-0 | |
| PPE/HIPS | 7.5 | | 7.5 | V-1 | |
| PPE/HIPS | 9 | | 9 | V-0 | |

What is claimed is:

1. A flame retardant combination comprising, as component A, a phosphinate of the formula (I) and/or a diphosphinate of the formula (II) and/or polymers of these

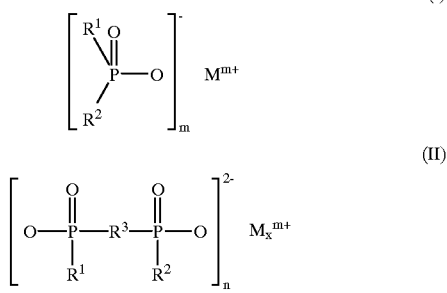

where
R$^1$ and R$^2$ are identical or different and are C$_1$–C$_6$-alkyl, linear or branched, and/or aryl;
R$^3$ is C$_1$–C$_{10}$-alkylene, linear or branched, C$_6$–C$_{10}$-arylene, -alkylarylene or -arylalkylene;
M is calcium ions, magnesium ions, aluminum ions and/or zinc ions,
m is 2 or 3;
n is 1 or 3;
x is 1 or 2;
and comprising, as component B, condensation products of melamine and/or reaction products of melamine with phosphoric acid and/or reaction products of condensation products of melamine with phosphoric acid and/or comprising a mixture of these.

2. A flame retardant combination as claimed in claim 1, wherein R$^1$ and R$^2$ are identical or different and are C$_1$–C$_6$-alkyl, linear or branched and/or phenyl.

3. A flame retardant combination as claimed in claim 1, wherein R$^1$ and R$^2$ are identical or different and are methyl, ethyl, n-propyl, isopropyl, n-butyl, tert-butyl, n-pentyl and/or phenyl.

4. A flame retardant combination as claimed in claim 1, wherein R$^3$ is methylene, ethylene, n-propylene, isopropylene, n-butylene, tert-butylene, n-pentylene, n-octylene or n-dodecylene.

5. A flame retardant combination as claimed in claim 1, wherein R$^3$ is phenylene or naphthylene.

6. A flame retardant combination as claimed in claim 1, wherein R$^3$ is methylphenylene, ethylphenylene, tert-butylphenylene, methylnaphthylene, ethylnapthylene or tert-butylnaphthylene.

7. A flame retardant combination as claimed in claim 1, wherein R$^3$ is phenylmethylene, phenylethylene, phenylpropylene or phenylbutylene.

8. A flame retardant combination as claimed in claim 1, wherein M is aluminum ions or zinc ions.

9. A flame retardant combination as claimed in claim 1, wherein component B is condensation products of melamine.

10. A flame retardant combination as claimed in claim 1, wherein the condensation products of melamine are melem, melam, melon and/or more highly condensed compounds thereof.

11. A flame retardant combination as claimed in claim 1, wherein component B is reaction products of melamine with phosphoric acid and/or reaction products of condensation products of melamine with phosphoric acid or a mixture of these.

12. A flame retardant combination as claimed in claim 1, wherein the reaction products are dimelamine pyrophosphate, melamine polyphosphate, melem polyphosphate, melam polyphosphate and/or mixed polysalts of this type.

13. A flame retardant combination as claimed in claim 1, wherein component B is melamine polyphosphate.

14. A flame-retardant plastic molding composition comprising a flame retardant combination as claimed in claim 1.

15. A flame-retardant plastic molding composition as claimed in claim 14, wherein the plastic is thermoplastic polymers of the type HIPS (high-impact polystyrene), polyphenylene ethers, polyamides, polyesters, polycarbonates or blends or polymer blends of the type ABS (acrylonitrile-butadiene-styrene) or PC/ABS (polycarbonate/acrylonitrile-butadiene-styrene) or PPE/HIPS (polyphenylene ether/high-impact polystyrene) plastics.

16. A flame-retardant plastic molding composition as claimed in claim 14, wherein the plastic is polyamides, polyesters or blends of PPE/HIPS.

17. A method for rendering thermoplastic polymers flame retardant, said method comprising the steps of:
providing a thermoplastic polymer; and
incorporating a flame retardant combination in accordance with claim 1 with the thermoplastic polymer.

18. A method according to claim 17 further comprising the step of:
selecting the thermoplastic polymer from the group consisting of HIPS (high-impact polystyrene), polyphenylene ethers, polyamides, polyesters, polycarbonates or blends or polymer blends of the type ABS (acrylonitrile-butadiene-styrene) or PCABS (polycarbonate/acrylonitrile-butadiene-styrene) and PPE/HIPS (polyphenylene high-impact polystyrene)

19. A method according to claim 17 further comprising the step of:

selecting the thermoplastic polymer from the group consisting of polyamide, polyester or blends of PPE/HIPS.

20. A method according to claim 17 further comprising the step of:

selecting a concentration for each of the components A and B of from 1 to 30% by weight based on the composition of the thermoplastic polymer, said selecting performed independently for each of the components A and B.

21. A method according to claim 17 comprising the step of:

selecting a concentration for each of the components A and B of from 3 to 20% by weight based on the composition of the thermoplastic polymer, said selecting performed independently for each of the components A and B.

22. A method according to claim 17 comprising the step of:

selecting a concentration for each of the components A and B of from 3 to 15% by weight based on the composition of the thermoplastic polymer, said selecting performed independently for each of the components A and B.

\* \* \* \* \*